(12) United States Patent
Montplaisir et al.

(10) Patent No.: US 8,297,561 B1
(45) Date of Patent: Oct. 30, 2012

(54) PIPE SUPPORT

(76) Inventors: Christian Montplaisir, Nominigue (CA); Martin Boudreau, Ste-Anne des Lacs (CA)

( * ) Notice: Subject to any disclaimer, the term of this patent is extended or adjusted under 35 U.S.C. 154(b) by 0 days.

(21) Appl. No.: 13/188,663

(22) Filed: Jul. 22, 2011

(51) Int. Cl.
*F16L 3/00* (2006.01)
*E21F 17/02* (2006.01)

(52) U.S. Cl. ............. 248/58; 278/49; 278/542; 278/543

(58) Field of Classification Search ............ 248/58, 248/49, 542, 543
See application file for complete search history.

(56) References Cited

U.S. PATENT DOCUMENTS

| | | | | |
|---|---|---|---|---|
| 3,637,176 | A * | 1/1972 | Suozzo | 248/59 |
| 5,009,386 | A * | 4/1991 | Berger et al. | 248/613 |
| 6,224,025 | B1 | 5/2001 | Alvarez | |
| 7,744,041 | B2 * | 6/2010 | Boudreau et al. | 248/58 |
| 2002/0074475 | A1 * | 6/2002 | Nordvik | 248/542 |

* cited by examiner

*Primary Examiner* — Amy J Sterling

(57) ABSTRACT

A pipe support for supporting a horizontally extending pipe in combination with a vertical hanger. The pipe support comprises a U-shaped body being opened at a top end thereof. The pipe support also comprises a pair of transversal vertical ribs, located on the outer surface of the body and extending transversally to an axis formed between the extremities of the body. The pair of transversal vertical ribs forms a space to receive the hanger therebetween, the space being positioned between the first and second extremities of the body. The pipe support further comprises a shock detection mechanism attachable to the pipe support. The shock detection mechanism comprises a shock indicator movable between a hold position and an alert position indicative that the pipe support was subjected to a shock exceeding a predetermined threshold force. A pipe support kit is also provided according to the present invention.

22 Claims, 14 Drawing Sheets

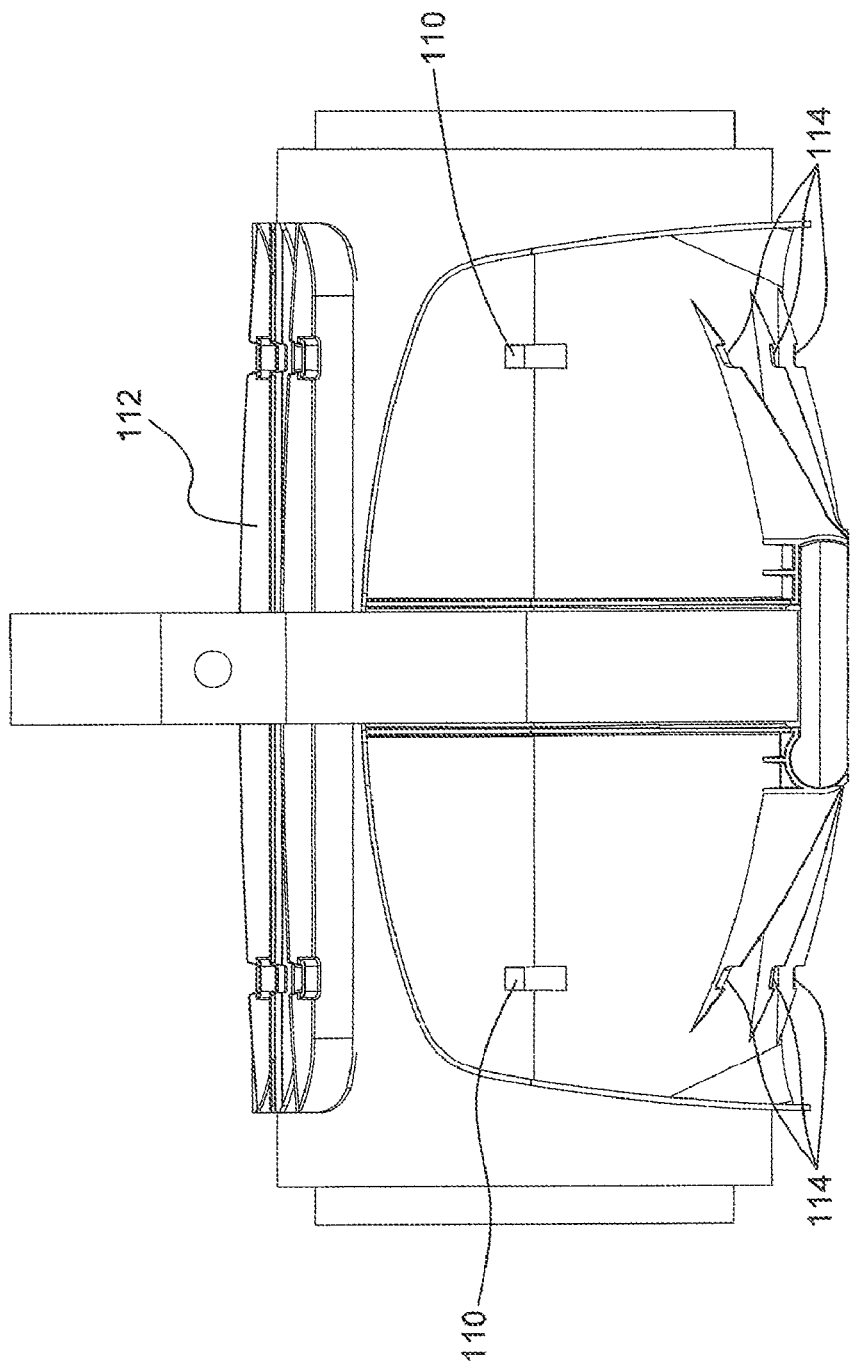

PIPE SUPPORT

FIELD OF THE INVENTION

The present invention relates to a pipe support. More particularly, it relates to a pipe support providing enhanced support to pipes extending horizontally, being easy to install and allowing shock detection. A kit for providing the same is also provided.

BACKGROUND OF THE INVENTION

In commercial and industrial constructions, horizontally running pipe systems are most commonly supported using a series of U-shaped pipe supporting members, such as clevis hangers, affixed to the ceiling or to any other overhead surface, and disposed at variable distances.

The pipe conduits often convey material at a temperature substantially higher or lower from the ambient temperature. In such cases, the pipe conduits usually require thermal insulation in order to prevent changes in the temperature of the conveyed material, due to heat transfer occurring at the pipe surface. Thermal insulation is also very effective in preventing the formation of condensation at the surface of the pipe in the case where the conveyed fluid material is colder than the ambient temperature, thereby avoiding premature rusting of the components of the pipe supporting system as well as water drops falling to the ground in the case of constructions where pipe systems are visible, e.g. warehouses, underground parking lots, or the like.

In the above-mentioned configuration, the pipe or the thermal insulation envelope covering the pipe usually rests directly on the U-shaped metal strips of the supporting members, which creates several problems, mostly caused by the sharp edges of the U-shaped metal strips and their relatively narrow width.

Firstly, when a thermal insulation envelope covers a pipe, traditional U-shaped pipe supporting members tend to crush the insulation layer at the support points. This is mostly due to the usual fragility of commonly used pipe insulation material and to the pressure being applied over a narrow contact surface between a support and the insulated pipe. This crushing of the insulation material causes a decrease in the thickness of the insulation layer of the pipe, negatively impacting on the overall insulation of the pipe. Furthermore, friction and vibration, which always occur at the support points, further degrade the insulation and can lead to rupture in the insulation envelope which further reduces the insulation of the pipe system. The reduction in insulation is often exacerbated by the conductive heat transfer between the pipe and the holder, since both components are often made of heat conductive material.

In addition, subsequent installation or replacement of thermal insulation over a length of pipe often proves to be a long and arduous job for workers attending to these tasks. The common method for installing an insulated pipe usually involves two steps. In the first step, a technician secures the U-shaped supporting members to the overhead surface and inserts the section of pipes in the supporting members. In the second step, an insulation technician covers the pipes with an insulation layer. In this last step, the supporting members cause difficulties as they prevent the sliding of the insulation layer on the pipes at the contact points.

Moreover, even pipe systems that do not have a thermal insulation layer suffer from setbacks caused by the use of traditional U-shaped pipe supports alone. Indeed, thermal expansion and contraction, as well as friction and vibration, can cause degradation of the structure of the pipe at the support points, which can lead to leakage of the conveyed material.

Another problem commonly encountered by pipe support technicians resides in the maintenance of the integrity of a pipe support system. Indeed, the support systems known in the art do not offer an easy and efficient solution to check whether a particular pipe support was affected by an abnormal shock imposed on the pipe system. For example, such abnormal shock could be the result of an earthquake or a water hammer. In the current state of things, following such an event, a technician would need to verify the integrity of every support one by one, as there is no flagging system for indicating which supports were subjected to a force beyond a predetermined threshold. Such a task has proved to be tiresome and time consuming.

A known method to overcome some of the drawbacks listed above is to affix a U-shaped pipe saddle, between the pipe and the U-shaped metal strip of the pipe supporting members at each support point, thereby widening the contact surface between a pipe (covered by an insulated layer or not) and the supports. The above-mentioned pipe saddle can be made of different materials, such as plastic or metal, and be affixed or held in place onto the support using different techniques, such as soldering in the case of a metal saddle, or clipping/gluing in the case of a plastic saddle.

U.S. Pat. No. 6,224,025, by Alvarez, discloses such a pipe saddle that can be used in combination with clevis hanger pipe supports. The invention discussed in the Alvarez patent also discloses means for locking the pipe saddle into place and preventing horizontal movement of the saddle. Such a solution solves some of the above-mentioned concerns by providing a larger contact surface locked onto the supporting member. In this document, the discussed attachment and movement prevention means are however limited to the bottom portion of the saddle and therefore do not offer optimal prevention of horizontal movements of the saddle. The solution proposed in the Alvarez patent do not provide any solution to the shock detection issue.

Another pipe support saddle known to the Applicant is the one described in U.S. Pat. No. 7,744,041. The document however teaches a pipe support to be used with vertically extending pipes, its design and components therefore not being optimized for the support of horizontally extending pipe systems. Once again, the proposed solution does not offer any solution for easy detection of abnormal shocks.

Other solutions such as the pipe insulation coupling member proposed in U.S. Pat. No. 7,207,527 also offer a solution for preventing premature deterioration of the insulated layer of a pipe system. However, the insulation coupling member of this particular solution is meant to retain adjacent ends of the insulation tubing against one another, therefore requiring that separate insulation tubes be used between each coupling member. This requirement complexifies the installation of the insulation layer over the pipes, which is highly undesirable. Again, no shock detection solution is provided with the device described in this document.

Hence, in light of the aforementioned, there is a need for an improved pipe support which, by virtue of its design and components, would be able to overcome or at least minimize some of the above-discussed prior art concerns.

SUMMARY OF THE INVENTION

According to one aspect of the present invention, there is provided a pipe support for supporting a horizontally extending pipe in combination with a vertical hanger. The pipe support comprises a U-shaped body being opened at a top end thereof and comprising a bottom wall and first and second side walls. The body, bottom wall and first and second side walls each have inner and outer surfaces extending along an axis between first and second extremities. The pipe support also comprises a pair of transversal vertical ribs, located on the outer surface of the body and extending transversally to the axis. The pair of transversal vertical ribs forms a space to receive the hanger therebetween. The space is positioned between the first and second extremities of the body. The pipe support further comprises a shock detection mechanism attachable to the pipe support. The shock detection mechanism comprises a shock indicator movable between a hold position and an alert position indicative that the pipe support was subjected to a shock exceeding a predetermined threshold force.

Preferably, the shock detection mechanism of the above-mentioned pipe support comprises a body having first and second faces, and a magnet receiving assembly mounted on the first face of the body, for receiving a magnet therein. The shock detection mechanism preferably further comprises a magnet positioned in the magnet receiving assembly and producing a magnetic field, as well as a door pivotally mounted on the second face of the body, the door having a finite thickness and being made of a magnetic material. The door is movable between the hold position where the door is magnetically held against the second face of the body and the alert position where the door extends away from the body due to gravity.

Still preferably, the strength of the magnetic field produced by the magnet and the magnetic properties of the door are such that when the pipe support is subjected to a shock exceeding the predetermined threshold force, the door is released from the magnetic field produced by the magnet and holding the door in the hold position.

Still preferably, the pipe support may further comprise a locking mechanism located on the outer surface of the bottom wall of the body and extending over a section of the pair of transversal vertical ribs. The locking mechanism may comprise a door having a locking edge. The door is hingedly mounted with respect to the pair of transversal vertical ribs and is movable between an opened position wherein the door allows passage of the hanger between the pair of transversal vertical ribs, and a closed position wherein the door sits over the space for receiving the hanger.

According to another aspect of the present invention there is provided a pipe support kit for supporting a horizontally extending pipe in combination with a vertical hanger. The pipe support kit comprises a pipe support comprising a U-shaped body being opened at a top end thereof and comprising a bottom wall and first and second side walls. The body, bottom wall and first and second side walls each have inner and outer surfaces extending along an axis between first and second extremities. The pipe support of the pipe support kit also has a pair of transversal vertical ribs, located on the outer surface of the body and extending transversally to the axis. The pair of transversal vertical ribs forms a space to receive the hanger therebetween, the space is positioned between the first and second extremities of the body. The pipe support kit also comprises a shock detection mechanism attachable to the pipe support. The shock detection mechanism comprises a shock indicator movable between a hold position and an alert position indicative that the pipe support was subjected to a shock exceeding a predetermined threshold force.

Preferably, the shock detection mechanism of the pipe support kit comprises a body having first and second faces and a magnet receiving assembly mounted on the first face of the body, for receiving a magnet therein. The shock detection mechanism of the pipe support kit may further comprise at least one magnet positionable in the magnet receiving assembly and producing a magnetic field. The shock detection mechanism of the pipe support kit may still further comprise at least one door pivotally mountable on the second face of the body. Each of the at least one door has a finite thickness and is made of a magnetic material. When a chosen combination of one of the at least one magnet and one of the at least one door is mounted on the shock detection mechanism, the strength of the magnetic field produced by the one of the at least one magnet that was chosen and the magnetic properties of the one of the at least one door that was also chosen are such that, when the pipe support is subjected to a shock exceeding the predetermined threshold force, the door is released from the magnetic field produced by the one of the at least one magnet and holding the door in the hold position.

Still preferably, the pipe support kit of the pipe support kit may further comprise a locking mechanism located on the outer surface of the bottom wall of the body and extending over a section of the pair of transversal vertical ribs. The locking mechanism preferably comprises a door having a locking edge and being hingedly mounted with respect to the pair of transversal vertical ribs. The door is movable between an opened position wherein the door allows passage of the hanger between the pair of transversal vertical ribs, and a closed position wherein the door sits over the space for receiving the hanger.

Preferably, the door of the locking mechanism is shaped to removably receive the shock detection mechanism therein, thus making the shock detection mechanism mountable on the door of the locking mechanism.

Advantageously, the pipe support and pipe support kit described hereinabove offers a solution to the crushing of the insulation layer covering the pipes and to the premature degradation of the structure of the pipes, by providing a larger contact surface between the pipes and the overhead supports. Also advantageously, the pair of transversal vertical ribs of the pipe support, located on the outer surface of the body and extending transversally to an axis running between the extremities, offers an enhanced prevention of linear movement of the pipe support. Moreover, the shock detection mechanism offers an advantageous solution for easy recognition of the supports that were affected by a force beyond a predetermined threshold, following an abnormal shock imposed on the pipe system.

The objects, advantages and features of the present invention will become more apparent upon reading the following non-restrictive description of a preferred embodiment thereof, given for the purpose of exemplification only, with reference to the appended drawings.

BRIEF DESCRIPTION OF THE DRAWINGS

For a better understanding of the invention and to show how the same may be carried into effect, reference is now made by way of example to the accompanying drawings in which:

FIG. 14 is a side view of a pipe support according to another possible embodiment of the present invention, shown in combination with a clevis hanger and a pipe section as part of its immediate surrounding.

DETAILED DESCRIPTION OF THE INVENTION

In the following description, the same numerical references refer to similar elements. The embodiments, geometrical configurations, materials mentioned and/or dimensions shown in the figures or described in the present description are preferred embodiments only, given solely for exemplification purposes.

Moreover, although the preferred embodiment of the pipe support and corresponding parts thereof consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation therebetween, as well as other suitable geometrical configurations, may be used for the pipe support according to the present invention, as will be briefly explained herein and as can be easily inferred herefrom, by a person skilled in the art, without departing from the scope of the invention.

Figure 1:
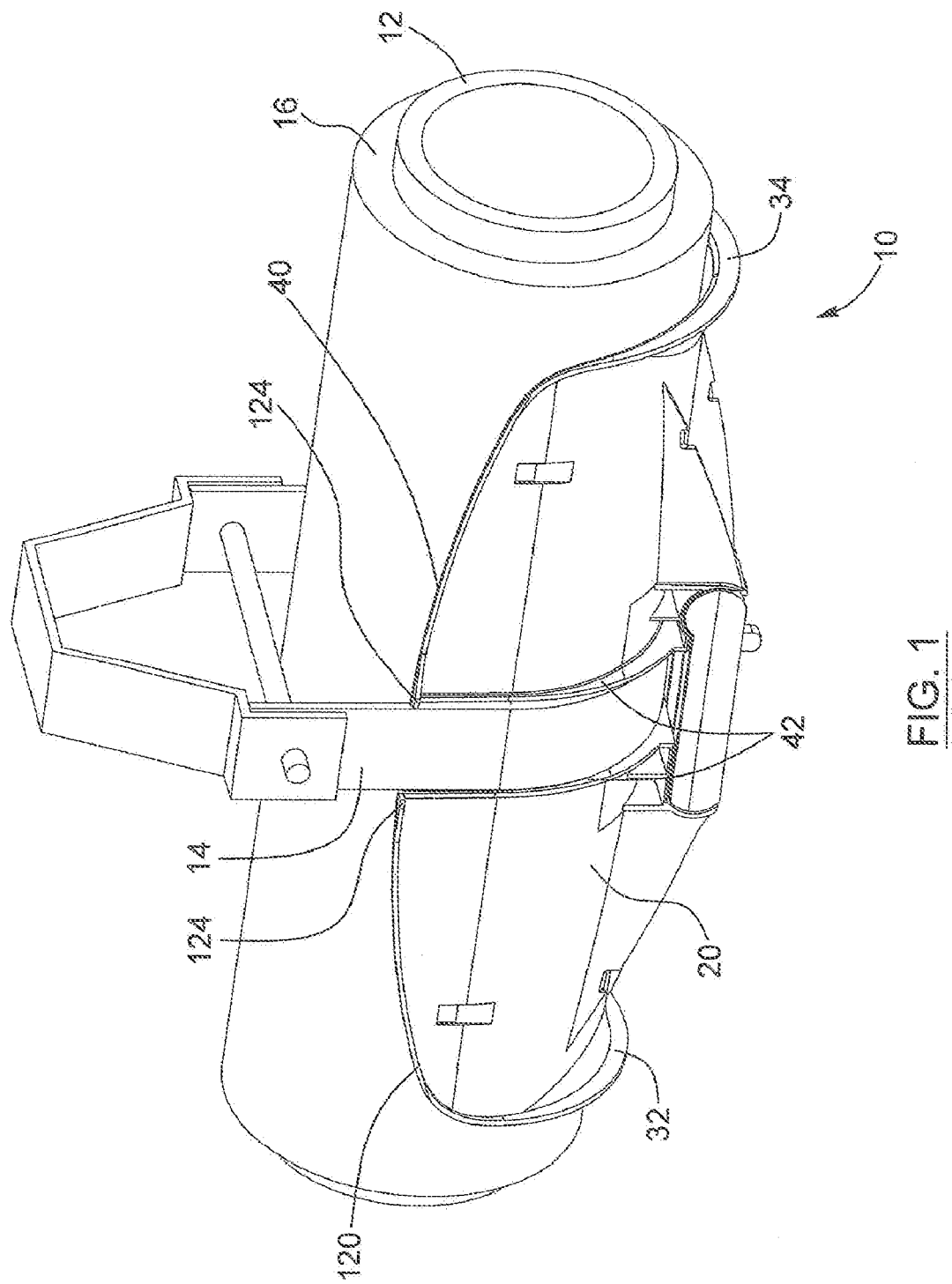
FIG. 1 is a perspective view of a pipe support according to a preferred embodiment of the present invention, shown in combination with a clevis hanger and a pipe section as part of its immediate surrounding.
Figure 2:
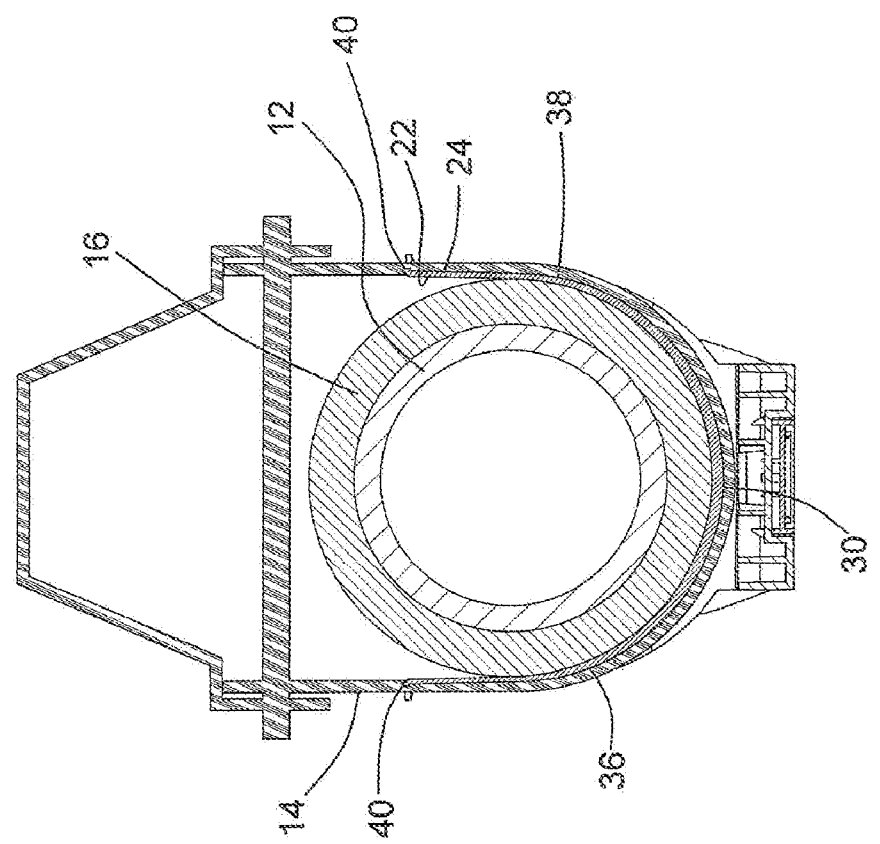
FIG. 2 is a cross-sectional view of the pipe support of FIG. 1, shown in combination with a clevis hanger and a pipe section as part of its immediate surrounding.

In accordance with one aspect of the present invention and as better illustrated in FIGS. 1 and 2, there is provided a pipe support 10 for supporting a section of pipe 12, to be used in combination with a U-shaped pipe supporting member 14, such as a clevis hanger. The pipe section 12 to be supported can be bare or can be covered by a thermal insulation layer 16, such as foam, rubber, calcium silicate, fiberglass, or any other material known by those skilled in the art, for providing thermal insulation for a pipe system.

The pipe support 10 comprises a U-shaped body 20 that is opened at a top end 40. The size of the U-shaped body can be varied to fit different pipe sizes. The body is formed of a bottom wall 30 and first 36 and second 38 side walls extending upwardly thereof. The body and its constitutive elements extend along an axis between a first extremity 32 and a second 34 extremity. The body and its constitutive elements also all have inner 22 and outer 24 surfaces. In the preferred embodiment, the first 36 and second 38 side walls present a slight outward angle from a reference vertical position. When a support 10 is inserted into a supporting member 14, this slight outward angle results in the first 36 and second 38 side walls exerting a pressure on the supporting member 14, therefore leading to a better maintaining of the support 10 into the supporting member 14. However it will be understood that other positioning of the side walls, such as vertical side walls, could also be used without departing from the scope of the present invention.

Moreover, each extremity of the bottom wall 30 and first 36 and second 38 side walls of the body of the pipe support 10, is provided with a rounded lip which reduces the friction between the pipe 12 (or the insulation layer 16) and the pipe support 10 when linear movement of the pipe 12 occurs, as a result of thermal expansion.

The outer surface 24 of the body 20 of the pipe support 10 is also provided with a pair of transversal vertical ribs 42 extending transversally with respect to the axis between the first 32 and second 34 extremities. The ribs of the pair of transversal vertical ribs 42 are disposed in a parallel configuration, at a finite distance from one another in order to form a space to receive the U-shaped pipe supporting member 14, used in combination with the present pipe support 10, therein. The pair of transversal vertical ribs 42 is meant to prevent linear movement of the pipe support 10 and to ensure that the pipe support 10 remains perpendicular to the supporting member 14. The pair of transversal vertical ribs 42 is always located between the first 32 and second 34 extremities of the body 20 and is preferably centered between these extremities 32, 34, in order to evenly split the stress imposed on the pipe support 10 by the weight of the pipe 12 and the material conveyed therein.

As can be seen in FIG. 1, in the illustrated preferred embodiment the pair of transversal vertical ribs 42 extends over the bottom wall 30 and the first 36 and second 38 side walls of the body 20, over their entire surface. However, the present invention could function properly with a pair of transversal vertical ribs 42 that only covers a portion of the bottom wall 30 and/or of the first 36 and second 38 side walls.

In the preferred embodiment, the height of the first 36 and second 38 side walls is greater than the height simply required for supporting the pipe 12 (with or without insulation layer 16). This increased height of the first 36 and second 38 side walls results in a greater length of the supporting member 14 being received between the pair of transversal vertical ribs 42, on each side of the pipe support 10, which further prevents rotation of the pipe support 10 relatively to the supporting member 14, and helps ensure that the pipe support 10 remains perpendicular to the supporting member 14.

Figure 3:
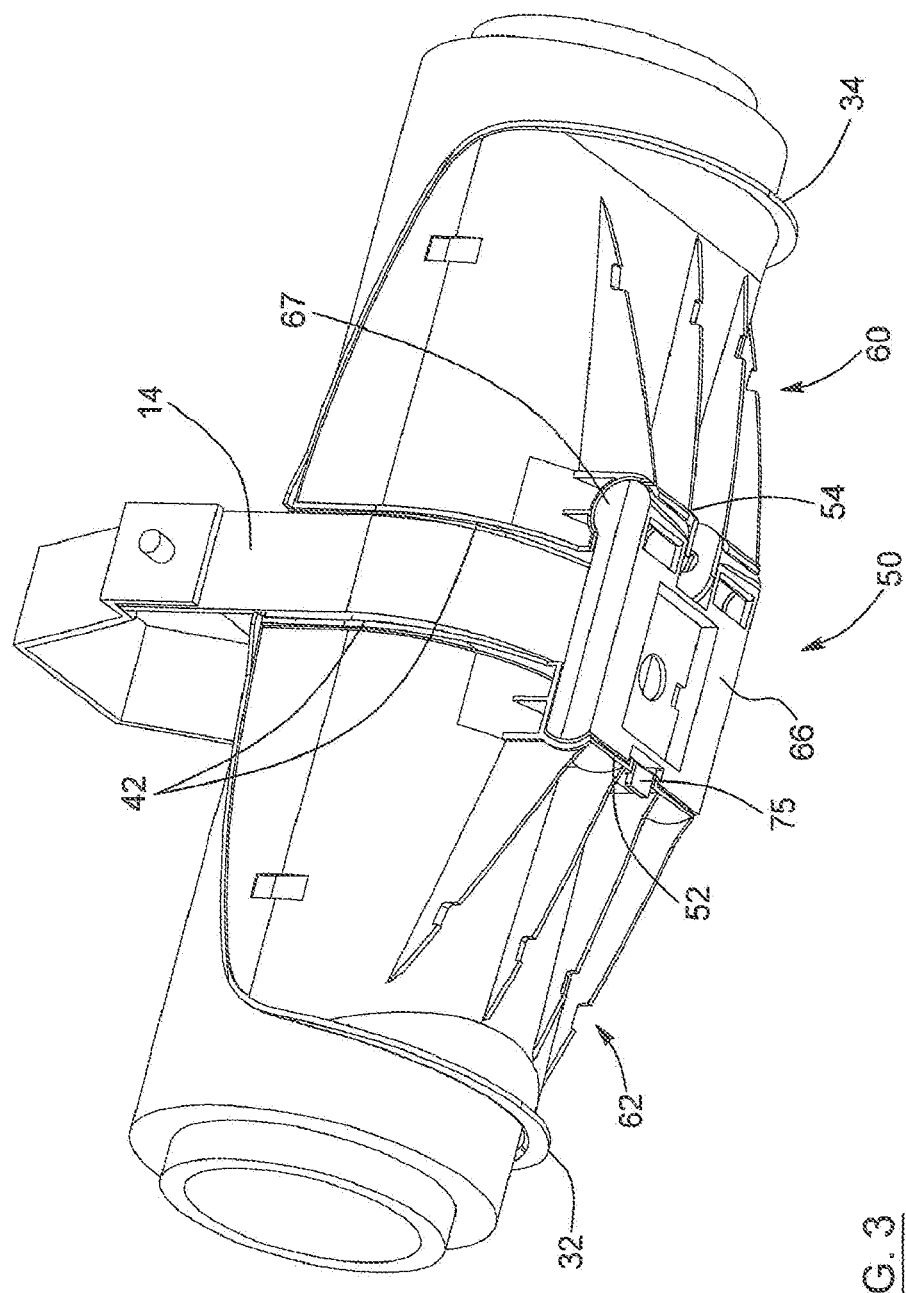
FIG. 3 is a bottom perspective view of a pipe support according to a preferred embodiment of the present invention, shown without a shock detection mechanism mounted therein and wherein the door of the locking mechanism is in the closed position.
Figure 4:
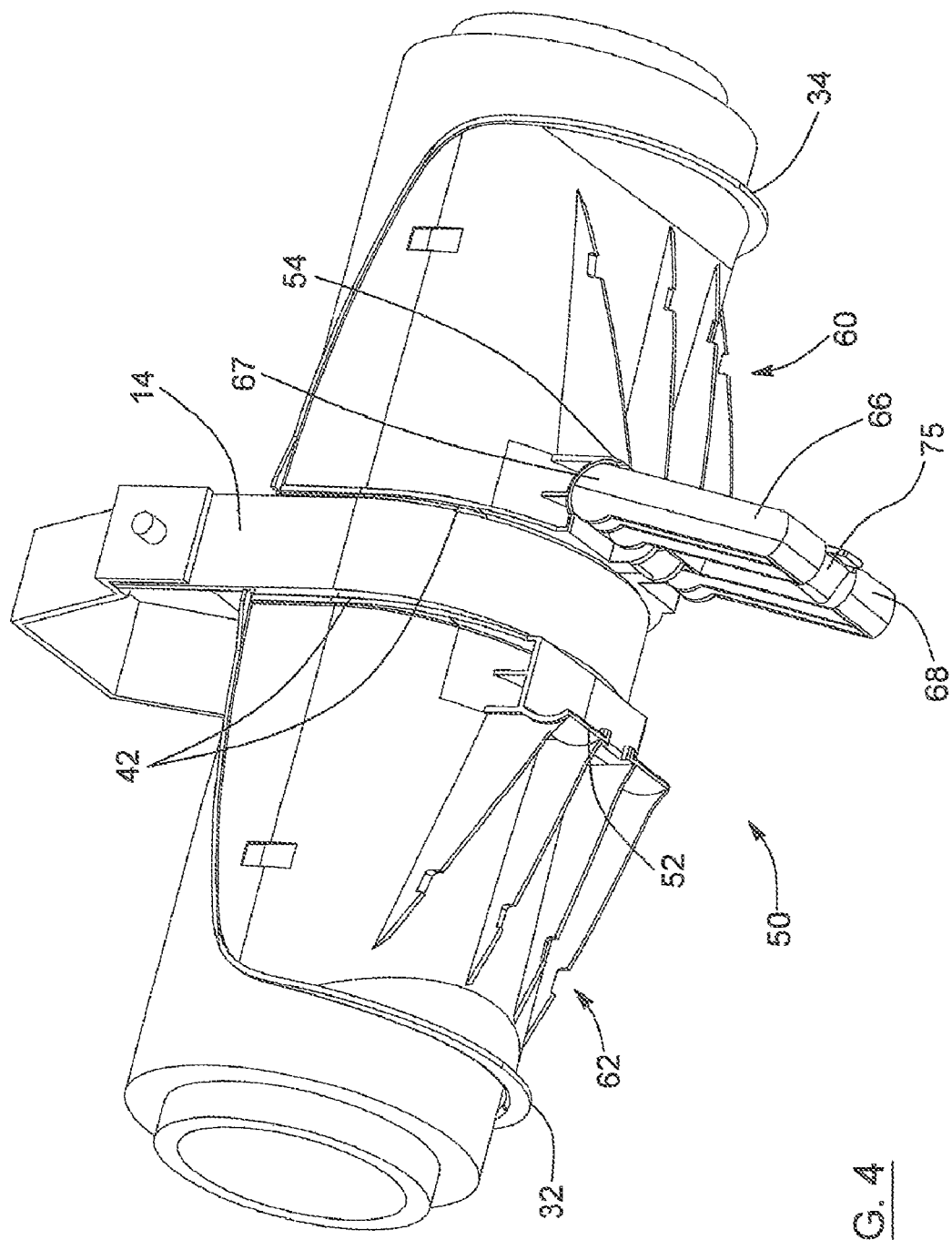
FIG. 4 is a bottom perspective view the pipe support of FIG. 3, wherein the door of the locking mechanism is in the opened position.

In the preferred embodiment, and as better illustrated in FIGS. 3 and 4, the pipe support is further provided with a locking mechanism 50 located on the outer surface 24 of the body 20, under the bottom wall 30 better shown in FIGS. 1 and 2. The locking mechanism 50 has left 52 and right 54 extremities and extends over a section of the pair of transversal vertical ribs 42, covering the space therein. Hence, the locking mechanism 50 provides locking capabilities, to lock the pipe support 10 on the U-shaped pipe supporting member 14 on which the pipe support 10 is mounted.

Preferably, the locking mechanism 50 further comprises a door 66 having a locking edge 68, the door being hingedly mounted on the locking mechanism 50 using a hinge 67. The door is movable between an opened position, shown in FIG. 4, where passage of the U-shaped pipe supporting member 14 between the pair of transversal vertical ribs 42 is allowed, and a closed position, shown in FIG. 3, where the door sits over the space formed between the transversal vertical ribs 42 for receiving the U-shaped pipe supporting member 14. In the illustrated preferred embodiment, when in the opened position, the door extends downward, perpendicularly from the bottom wall. In contrast, when in the closed position, the door is essentially parallel with the bottom wall 30, over a section of the pair of transversal vertical ribs 42. The terms perpendicular and parallel are meant in their broadest sense, and the door 66 need not be exactly perpendicular form the bottom wall 30 in the opened position or exactly parallel with the bottom wall 30 in the closed position.

Preferably, the locking mechanism also comprises a latch 75 located at the locking edge 68 of the door. 66. The latch 75 is meant to maintain the door 66 of the locking mechanism 50 in the closed position, following a manual positioning of the door in the closed position. Thus, when installing the pipe support 10 of the present invention onto a U-shaped pipe supporting member 14, a technician will manually close the door 66 of the locking mechanism 50 to lock the pipe support 10 in place, after sliding the pipe support 10 onto the supporting member 14. The pipe support 10 will then remain locked, given the latch 75 of the door 66, until the door is manually unlocked and opened by a user.

The downward pressure exerted by the weight of the pipe 12 and the fluid conveyed therein will also help maintain the door 66 of the locking mechanism 50 in the closed position, once it has been manually closed by the technician. Indeed, the downward pressure exerted by the weight of the pipe 12 and the fluid conveyed therein, combined with the configuration of the two sets of longitudinal vertical ribs 60 and 62 described hereinafter, result is a slight bending of the extremities of the pipe support 10 towards the ground, therefore resulting in a compression of the locking edge 68 of the door 66 towards the corresponding extremity 52. This compression of the locking edge 68 of the door 66 towards the corresponding extremity 52 leads to the door 66 being maintained in the closed position by friction.

Figure 7:
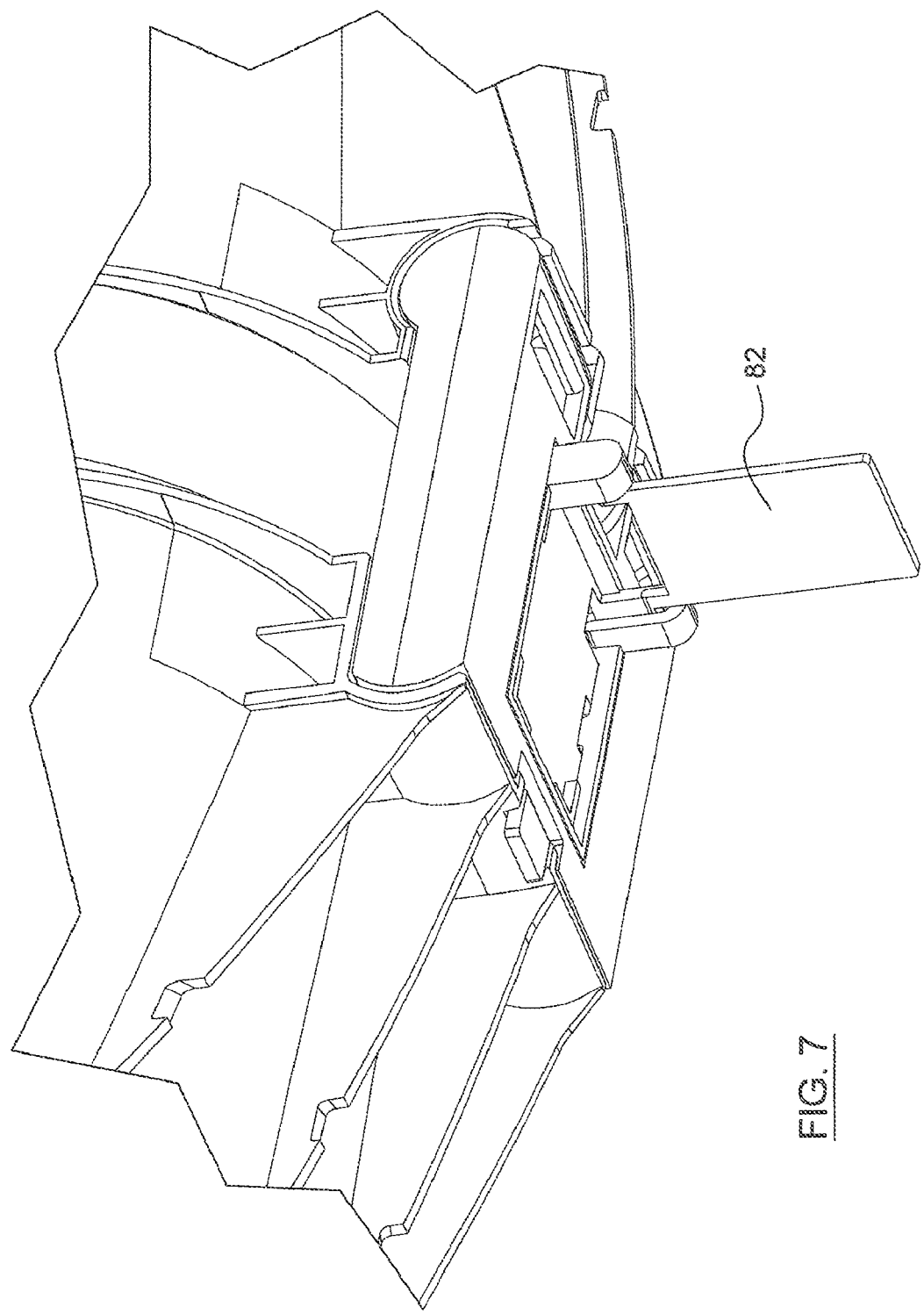
FIG. 7 is a close-up bottom view of a pipe support according to a preferred embodiment of the present invention, with a shock detection mechanism according to a preferred embodiment of the present invention mounted thereon, the shock detection mechanism being in an alert position.

Moreover, as can better be seen on FIG. 7, in the preferred embodiment, the locking edge 68 of the door 66 presents a convex configuration and the corresponding extremity 52 of the locking mechanism 50 presents a matching concave configuration. This matching convex configuration of the locking edge 68 of the door 66 and concave configuration of the corresponding extremity 52, further helps maintain the door 66 in the closed position, when the locking edge 68 of the door is compressed towards the corresponding extremity 52, by the downward pressure resulting from the combined weight of the pipe 12 and the conveyed fluid material, as explained hereinabove.

As may also be seen on FIGS. 3 and 4, the pipe support 10 according to this preferred embodiment also includes two sets of longitudinal vertical ribs 60 and 62, also located on the outer surface 24 of the body 20, under the bottom wall 30. Both sets of longitudinal vertical ribs 60 and 62 comprise a plurality of longitudinal vertical ribs. The two sets 60 and 62 are provided in order to reinforce the bottom wall 30 of the body 20 of the pipe support 10. In the present embodiment, the first set 60 extends radially from the right extremity 54 of the locking mechanism 50 toward the right extremity 34 of the bottom wall 30, while the second set 62 extends radially from the left extremity 52 of the locking mechanism 50 toward the left extremity 32 of the bottom wall 30.

The height of the longitudinal vertical ribs is preferably at its highest at the junction of the ribs and the extremities of the locking mechanism 50, and preferably decreases as it moves closer to the corresponding extremity. This decrease in the height of the ribs toward the extremities 32, 34 facilitates the installation of the pipe support 10 on the supporting member 14, as it provides guidance toward the space between the pair of transversal vertical ribs 42. The radial configuration of the ribs offers increased support. However, the invention could also work with ribs extending from their respective extremities according to a different configuration, as will be apparent to a person skilled in the art.

Now referring to FIGS. 5 to 13, the pipe support 10 is further provided with a shock detection mechanism 70 which is attachable to the pipe support 10. The shock detection mechanism 70 is formed of a body 72 having first 76 and second 74 faces. The body 72 is preferably made of non magnetic material such as plastic or the like.

Figure 10:
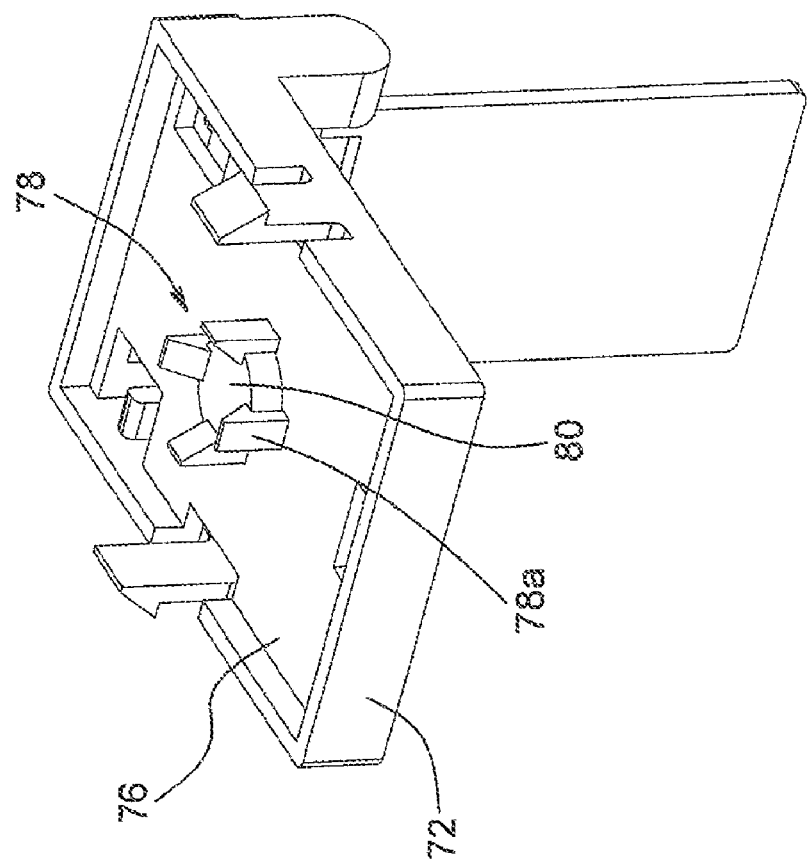
FIG. 10 is a top perspective view the shock detection mechanism of FIG. 9.
Figure 12:
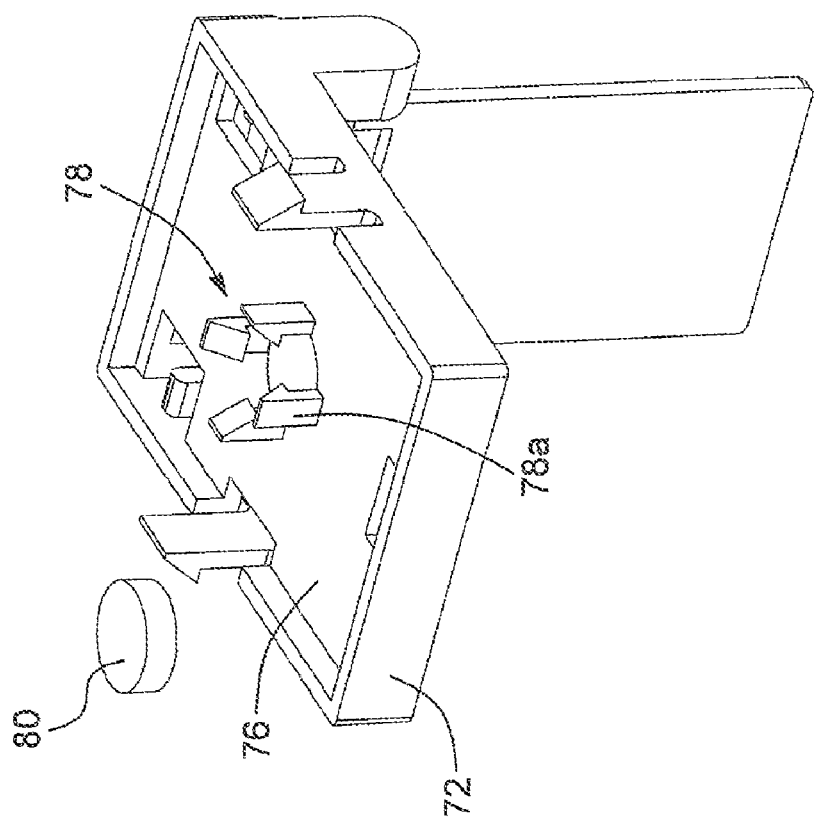
FIG. 12 is a top perspective view of the shock detection mechanism of FIG. 9, wherein the magnet is removed from the mechanism.

As better shown in FIGS. 10 and 12, a magnet receiving assembly 78 is mounted on the first face 76 of the body 72. In the preferred embodiment, the magnet receiving assembly 78 is formed of 4 brackets 78a extending perpendicularly from the first face 76 of the body 72 and removably holding a magnet 80 therein. As will be apparent to one skilled in the art, the number of brackets can be varied, and other mechanical equivalent could be used to maintain the magnet 80 in place, at a position adjacent to the first face 76 of the body 72. The magnet can be removed from the magnet receiving assembly 78 (as shown in FIG. 12) for a magnet change or other maintenance purposes. The magnet 80 produces a magnetic field that is important for the functioning of the shock detection mechanism according to this preferred embodiment, as will be explained hereinafter.

Figure 8:
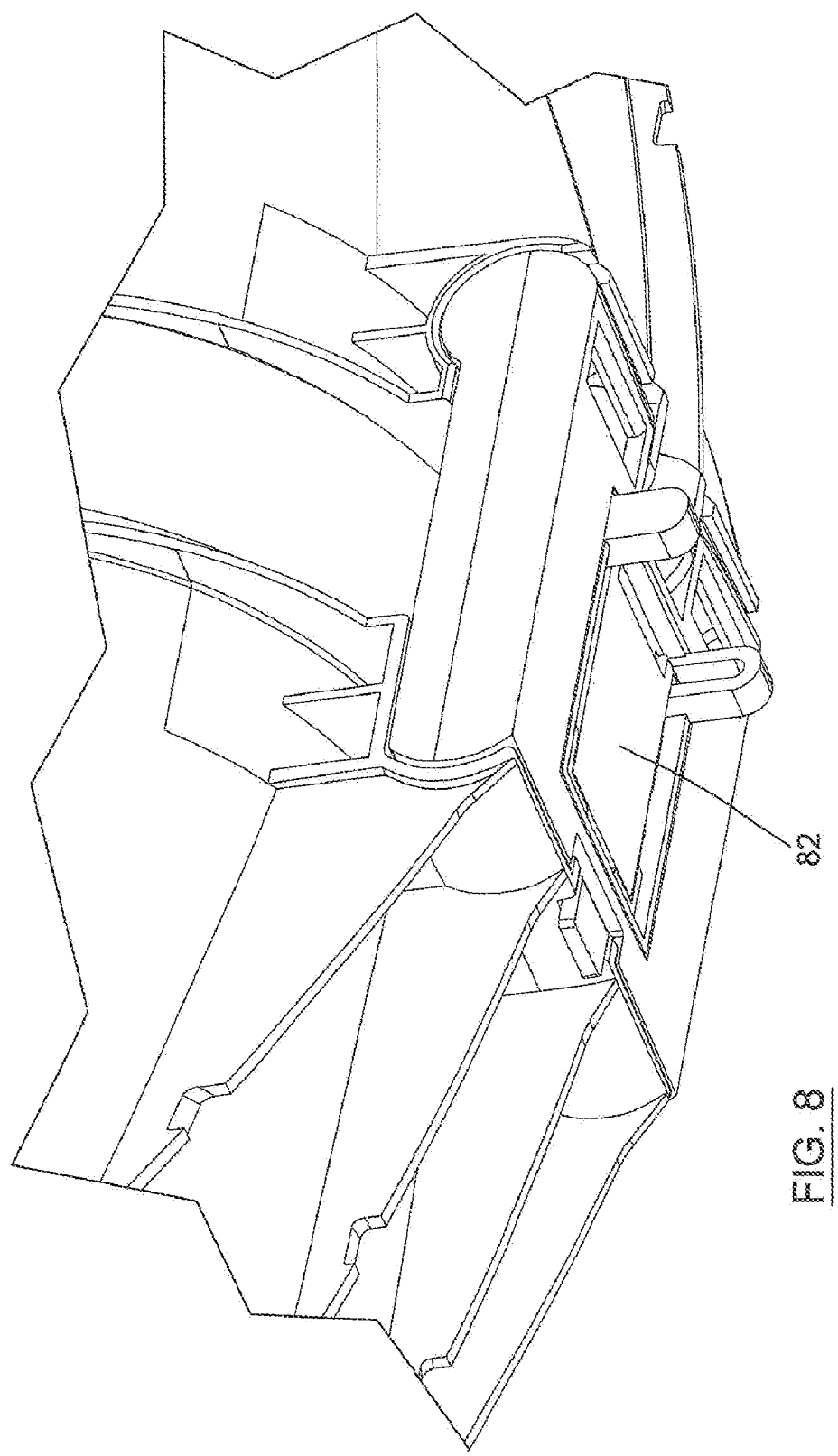
FIG. 8 is another close-up bottom view of the pipe support with a shock detection mechanism of FIG. 7, the shock detection mechanism being in a hold position.
Figure 9:
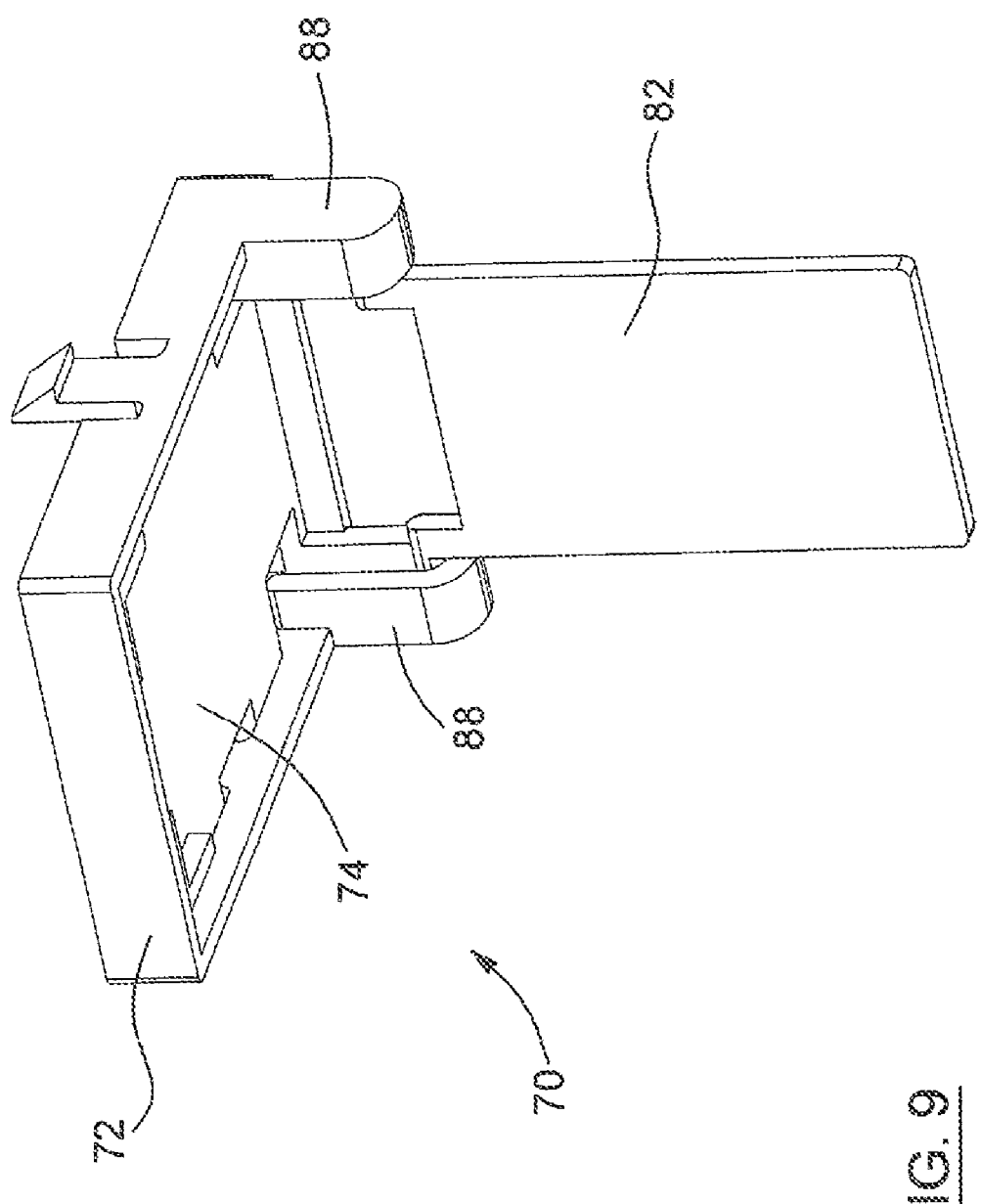
FIG. 9 is a bottom perspective view of shock detection mechanism according to a preferred embodiment of the present invention.

As better shown in FIGS. 7 to 9, the shock detection mechanism 70 further comprises a shock indicator movable between a hold position shown in FIG. 8, and an alert position indicative that the pipe support 10 was subjected to a shock exceeding a predetermined threshold force, this alert position being shown in FIG. 7. In the preferred embodiment, the shock indicator is a door 82 pivotally mounted on the second face 74 of the body 72. The door 82 has a finite thickness and is made of a magnetic material such as steel.

When the shock detection mechanism 70 is mounted on the pipe support 10, the technician making the installation will manually position the door 82, acting as shock indicator, in the hold position. In this hold position, the door 82 will be magnetically held against the second face 74 of the body 72, given the magnetic field produced by the magnet 80 located adjacent to the first face 76 of the body 72. In the event where the pipe system is subjected to a shock, for example in the case of an earthquake or of a water hammer, if the shock is beyond a predetermined threshold force, the magnetic field produced by the magnet 80 will not be sufficient to retain the door 82 in place, and the door 82 will pivotally move away from the body 72. Therefore, after such en event, or in the course of regular maintenance, a technician will be able to easily locate the pipe supports 10 that have been subjected to a shock beyond the predetermined threshold force, by simply looking for the pipe supports 10 where the door 82 of the shock detection mechanism 70 is in the alert position, indicating that the pipe run was subjected to a pipe shock.

The predetermined shock threshold will be determined by the strength of the magnetic field produced by the magnet 80 mounted onto the shock detection mechanism 70, and the magnetic properties of the door 82. The magnetic properties of the door 82 will depend from the material chosen, the thickness of the door and its resulting weight. Preferably, the door will be made of metal such as steel, but could also be made of different materials without departing from the scope of the present invention.

In order to provide the possibility for the user to select a desired threshold force, the present invention can be sold as a kit comprising a pipe support 10 and a shock detection mechanism 70 having the above-mentioned characteristics, as well as a plurality of magnets 80 producing magnetic fields of different strengths and/or a plurality of mountable doors 82 having different magnetic properties. For easy recognition of the strength of the magnetic field produced by a magnet 80 and/or of the magnetic properties of a door 82, the magnets 80 and/or doors 82 could be provided with different color code.

In the preferred embodiment, the kit would comprise only one magnet 80 producing a magnetic field of a fixed strength and a plurality of doors 82. Different shock thresholds will be possible by the selection of the desired door 82 and mounting of the selected door 82 onto the shock detection mechanism 70. The use of a combination of a single magnet 80 and a plurality of doors 82 is preferable, given the fact that it is easier to mount/remove a door 82 from the shock detection mechanism 70, than it is to mount/remove the magnet 80, as will become apparent from the description hereinafter, especially after the shock detection mechanism 70 has been attached to the pipe support 10. However, different arrangement of magnets 80 and/or doors 82 could be used in the present kit without departing from the scope of the present invention.

Figure 11:
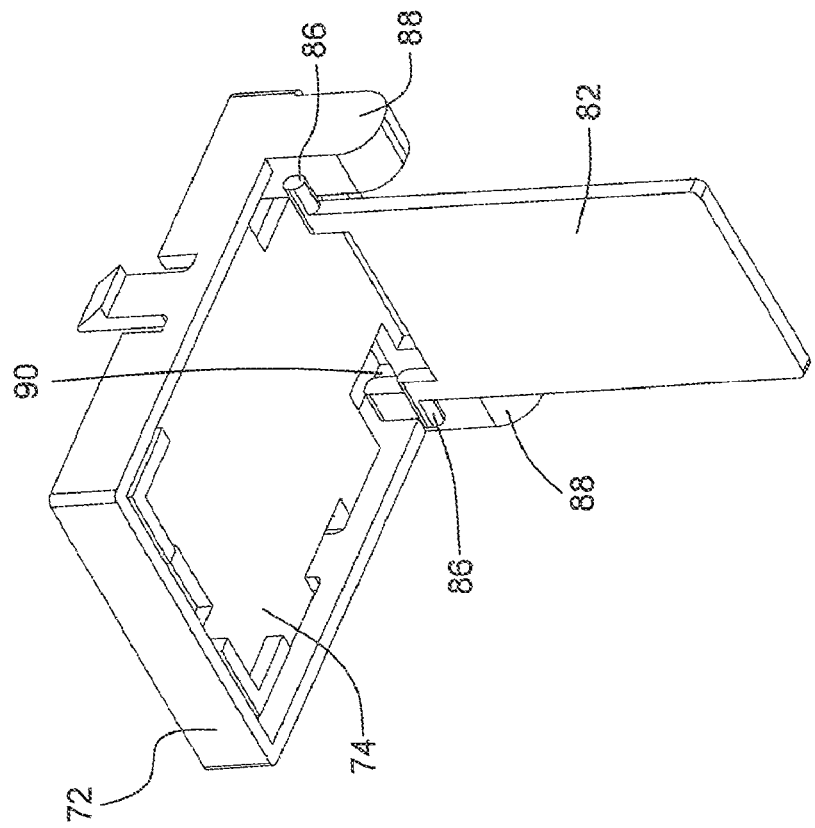
FIG. 11 is a bottom perspective view of the shock detection mechanism of FIG. 9, wherein the door is removed from the mechanism.

As better seen on FIGS. 9 and 11, the door 82 of the shock detection mechanism 70 is pivotally mounted on the shock detection mechanism 70 using a pair of appendages 86 located at an extremity of the door, on opposite sides. The appendages 86 are preferably moulded as a part of the door 82, during production, but could also be joined to the door 82 through known joining techniques such as soldering, welding, gluing or the like. The pair of appendages 86 is sized to fit into a pair of U-shaped arms 88 on the second face 74 of the body 72, to provide the pivotal capabilities of the door 82.

Figure 13:
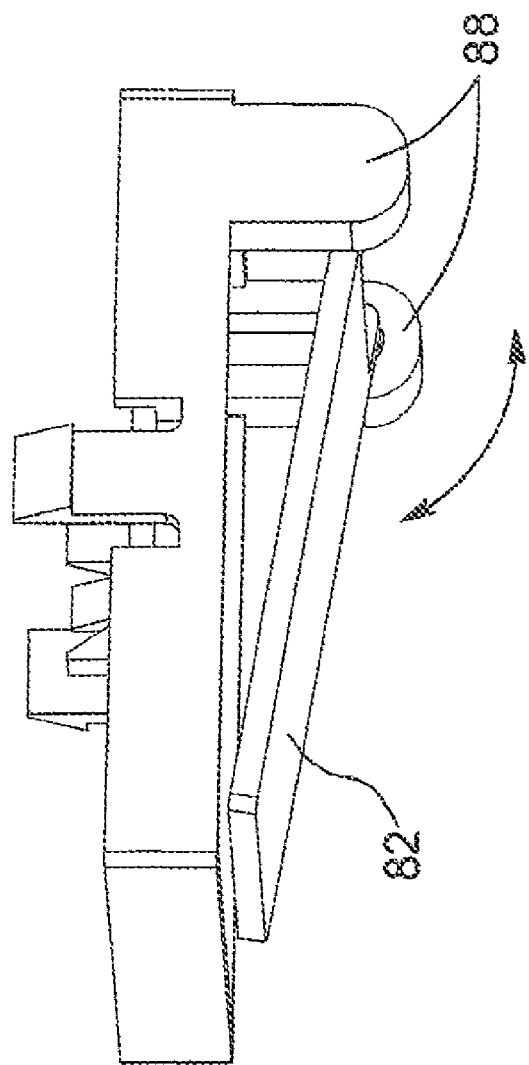
FIG. 13 is a side view of the shock detection mechanism of FIG. 9, wherein the door is balancing after being released from the hold position.

As can be seen on FIG. 13, the pair of U-shaped arms 88 preferably extends perpendicularly from the second face 74 of the body 72 of a distance that is such that when the door 82 is released from the hold position, following a shock exceeding the predetermined threshold force, the appendages 86 slide along the U-shaped arms 88 and the extremity of the door 82, where the appendages 86 are located, is driven away from the second face 74 of the body 72. Therefore, balancing of the door 82, following a release from the hold position, cannot cause the door to be subjected to the magnetic force of the magnet and return to the hold position, without being manually repositioned in this position.

In other words, given the length of the U-shaped arms 88, when a shock exceeding the predetermined threshold force occurs, the following sequence of events will take place. Firstly, the door 82 of the shock mechanism 70 will be released from the magnetic field produced by the magnet 80. Secondly, upon release of the door 82 from the magnetic field, the appendages 86 will slide towards the extremity of the U-shaped arms 88 located opposite to the second face 74 of the body 72, through the effect of gravity. Thirdly, once the appendages 86 have reached the extremity of the U-shaped arms 88, gravity will cause the door to swing temporarily.

The sliding of the appendages 86 towards the extremity of the U-shaped arms 88 located opposite to the second face 74 of the body 72, occurring at the second step described above, is important to prevent the door 82 from being attracted by the magnetic field of the magnet 80 during an upswing of the door 82, and return to the closed position. In the present configuration, such a return to the closed position cannot occur, since the pivoting extremity of the door 82 is located at a distance from the second face 74 of the body 72 that corresponds to the length of the U-Shaped arms 88.

Now referring to FIG. 11, the door 82 can easily be mounted on, or removed from, the shock detection mechanism 70. In a preferred embodiment, this easy mounting or removal of the door can be made possible by an opening 90 at the top end of each arm of the pair of U-shaped arms 88 and by a special configuration of the shape of the body 72 of the shock detection mechanism 70 and of the door 82, to allow the appendages 86 to be inserted into, or removed from, the arms of the pair of U-shaped arms 88. Alternatively, other configurations could also be provided in order to allow such a mounting or removal of the door 82 from the shock detection mechanism 70 without departing from the scope of the present invention.

Figure 5:
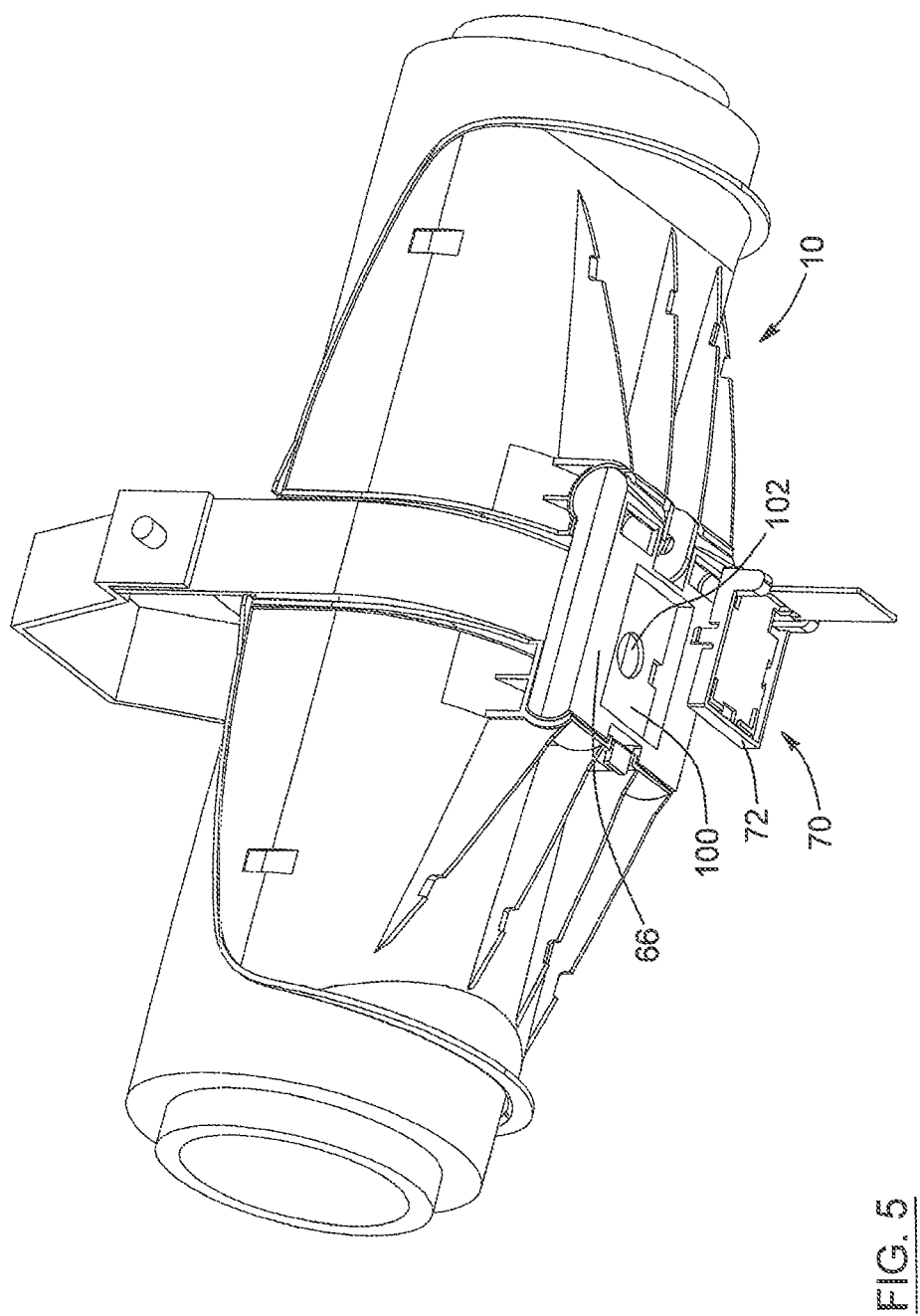
FIG. 5 is a bottom perspective view of a pipe support according to a preferred embodiment of the present invention, and a shock detection mechanism according to a preferred embodiment of the present invention, the pipe support and shock detection mechanism being disconnected.
Figure 6:
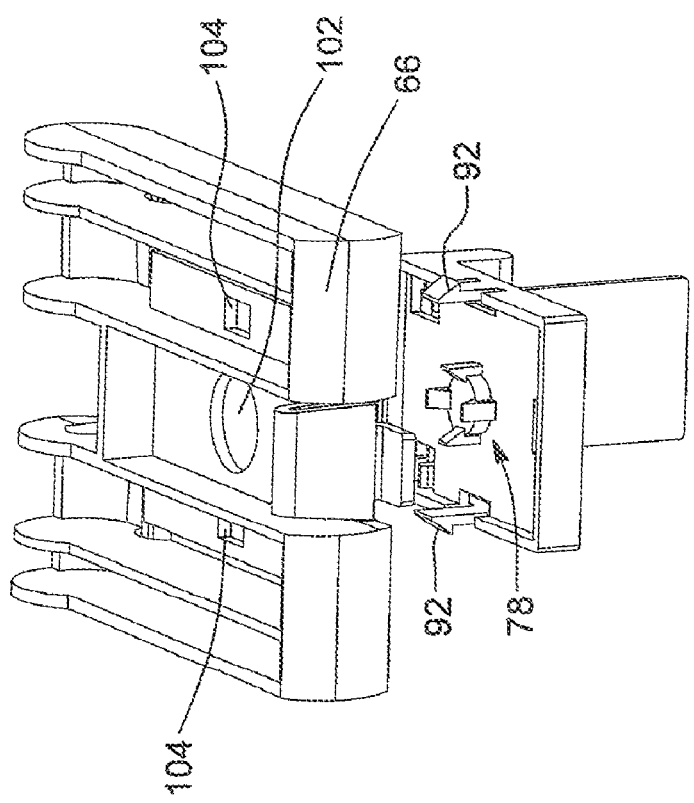
FIG. 6 is a perspective view of a door of the locking mechanism of the pipe support according to a preferred embodiment of the present invention, and a shock detection mechanism according to a preferred embodiment of the present invention, the door and shock detection mechanism being disconnected.

As can better be seen on FIGS. 5 and 6, in the preferred embodiment, the door 66 of the locking mechanism 50 is shaped to receive the shock detection mechanism 70 therein. Indeed, the door 66 of the locking mechanism 50 is provided with a cavity 100 matching the size of the body 72 of the shock detection mechanism 70. The cavity 100 preferably further comprises a central aperture 102 and side apertures 104. The central aperture 102 is sized and shaped to receive the magnet receiving assembly 78 of the shock detection mechanism 70 therein. The side apertures 104 are sized to receive corresponding latches 92, located on the sides of the body 72 of the shock detection mechanism 70. In the illustrated preferred embodiment, two side apertures 104 are provided on opposite sides of the cavity 100 for the matching latches 92 on opposite sides of the body 72 of the shock detection mechanism 70. The matching side apertures 104 of the cavity 100 and latches of the shock detection mechanism 70 allow the shock detection mechanism 70 to be attached onto the pipe support 10, while remaining detachable if need be. However different configuration of the side apertures 104 and matching latches 92 of the shock detection mechanism 70, or even a different attachment system, could be provided for removable attachment of the shock detection mechanism 70 to the door 66 of the locking mechanism 50 without departing from the scope of the present invention. Moreover, even though in the preferred configuration the shock detection mechanism 70 is mounted on the door 66 of the locking mechanism 50, the shock detection mechanism 70 could alternatively be mounted on another component of the pipe support 10, without departing from the scope of the present invention.

The pipe support 10 of the present invention could function without the shock detection mechanism 70 mounted thereon, but evidently no indicator of an abnormal shock would be provided in this case.

The pipe support according to the present invention is preferably made of a rigid material, such as plastic, which presents a good rigidity while still offering a certain flexibility if need be, keeps its rigid aspect as time passes, and is not too heavy in order to facilitate the installation of the pipe supports 10 by a technician.

Also preferably, the extremities 32 and 34 of the body 20 of the present pipe support 10 are outwardly flared. This outside flare results in less friction between the thermal insulation layer 16 and the pipe support 10, or between the pipe itself 12 and the pipe support 10, at the extremities 32 and 34 of the body 20, hence decreasing the weariness of the thermal insulation layer 16 or of the physical structure of the pipe 12.

Moreover, the inner surface 22 of the bottom wall 30 preferably has a textured anti-friction coating. The anti-friction coating helps reducing the friction between the insulation layer 16, or the pipe 12 and the pipe support 10, thereby also reducing the weariness of those components. When an insulation layer 16 is used, the texture of the coating also leaves a thin film of air between the insulation layer 16 and the pipe support 10, which facilitates linear movement of the pipe 12 (with or without insulation 16) therein, as a result of thermal expansion.

In another embodiment of the present invention shown in FIG. 14, the side walls 36 and 38 preferably further include apertures 110. These apertures 110 can be used for inserting plastic tie band in order to fasten a universal cover 112. The cover 112, when fastened to the pipe support 10, prevents upward movement of the pipe contained therein, adding to the overall stability of the pipe 12 (covered by an insulation layer 16 or not) supported by the pipe support 10. In this alternative embodiment, each rib of the sets of longitudinal vertical ribs 60 and 62 also preferably comprise a notch 114 which is vertically inline with the corresponding aperture 110 to fit the plastic tie band.

In order to further facilitate the installation of the pipe support 10, and as can be seen in FIG. 1, the outside edge of the body 20 of the pipe support 10 preferably has a perpendicular border 120 of variable height extending perpendicularly from the body 20. The perpendicular border 120 preferably runs along the entire length of the outside edge, apart from the space for receiving the supporting member 14, located between the pair of transversal vertical ribs 42, at a top end 40 of each of the side walls 36 and 38. Preferably, the height of the perpendicular border 120 increases moving toward a junction 124 of the perpendicular border 120 and one of the ribs of the pair of transversal vertical ribs 42. At the junction 124 of the two components, the height of the perpendicular border 120 matches that of each rib of the pair of transversal vertical ribs 42. This configuration helps guiding the supporting member 14 towards the space between the pair of transversal vertical ribs 42 in order to easily guide and secure the pipe support 10 onto the supporting member 14.

It will be readily understood by one skilled in the art that the above-mentioned embodiment is merely illustrative of the possible specific embodiments which may represent principles of the present invention. Of course, numerous modifications could be made to the embodiment described above without departing from the scope of the present invention as defined in the appended claims.

The invention claimed is:

1. A pipe support for supporting a horizontally extending pipe in combination with a vertical hanger, the pipe support comprising:
   a U-shaped body being opened at a top end thereof and comprising a bottom wall and first and second side walls, the body, bottom wall and first and second side walls each having inner and outer surfaces extending along an axis between first and second extremities;
   a pair of transversal vertical ribs, located on the outer surface of the body and extending transversally to the axis, the pair of transversal vertical ribs forming a space to receive the hanger therebetween, the space being positioned between the first and second extremities of the body;
   a shock detection mechanism attachable to the pipe support, the shock detection mechanism comprising a shock indicator movable between a hold position and an alert position indicative that the pipe support was subjected to a shock exceeding a predetermined threshold force.

2. The pipe support of claim 1, wherein the pipe support further comprises a locking mechanism located on the outer surface of the bottom wall of the body and extending over a section of the pair of transversal vertical ribs.

3. The pipe support of claim 2, wherein the locking mechanism comprises a door having a locking edge, the door being hingedly mounted with respect to the pair of transversal vertical ribs and being movable between an opened position wherein the door allows passage of the hanger between the pair of transversal vertical ribs, and a closed position wherein the door sits over the space for receiving the hanger.

4. The pipe support of claim 3, wherein the locking mechanism further comprises a latch located on the locking edge of the door, the latch temporarily maintaining the door in the closed position, following a manual positioning of the door in the closed position.

5. The pipe support of claim 3, wherein the locking edge of the door of the locking mechanism and a corresponding extremity of the locking mechanism present complementary convex and concave configurations.

6. The pipe support of claim 1, wherein the shock detection mechanism comprises:
   a body having first and second faces;
   a magnet receiving assembly for receiving a magnet therein, the magnet receiving assembly being mounted on the first face of the body;
   a magnet positioned in the magnet receiving assembly and producing a magnetic field;
   a door pivotally mounted on the second face of the body, the door having a finite thickness and being made of a magnetic material, the door being movable between the hold position where the door is magnetically held against the second face of the body and the alert position where the door extends away from the body due to gravity,
wherein a strength of the magnetic field produced by the magnet and magnetic properties of the door are such that when the pipe support is subjected to a shock exceeding the predetermined threshold force, the door is released from the magnetic field produced by the magnet.

7. The pipe support of claim 6, wherein the door of the shock detection mechanism is pivotally mounted on the shock detection mechanism using a pair of appendages located at an extremity of the door on opposite sides, the pair of appendages being sized to fit into a pair of U-shaped arms on the second face of the body.

8. The pipe support of claim 7, wherein a length of each arm of the pair of U-shaped arms is such that when the door is released from the hold position, following a shock exceeding the predetermined threshold force, the pair of appendages of the door are displaced towards an extremity of the U-shaped arms located opposite to the second face of the body, by gravity, thereby preventing the door from returning to the hold position by balancing of the door.

9. The pipe support of claim 7, wherein at least one arm of the pair of U-shaped arms comprises an opening allowing insertion or removal of a corresponding appendage of the pair of appendages of the door therein.

10. The pipe support of claim 2, wherein the shock detection mechanism comprises:
a body having first and second faces;
a magnet receiving assembly for receiving a magnet therein, the magnet receiving assembly being mounted on the first face of the body;
a magnet positioned in the magnet receiving assembly and producing a magnetic field;
a door pivotally mounted on the second face of the body, the door having a finite thickness and being made of a magnetic material, the door being movable between the hold position where the door is magnetically held against the second face of the body and the alert position where the door extends away from the body due to gravity,
wherein a strength of the magnetic field produced by the magnet and magnetic properties of the door are such that when the pipe support is subjected to a shock exceeding the predetermined threshold force, the door is released from the magnetic field produced by the magnet.

11. The pipe support of claim 3, wherein the door of the locking mechanism is shaped to removably receive the shock detection mechanism therein, and wherein the shock detection mechanism is mounted on the door.

12. The pipe support of claim 2 wherein the pipe support further comprises:
a first set of longitudinal vertical ribs, located on the outer surface of the bottom wall, the first set of longitudinal vertical ribs comprising a plurality of longitudinal vertical ribs of variable height extending from a first extremity of the locking mechanism to a corresponding extremity of the bottom wall; and
a second set of longitudinal vertical ribs, located on the outer surface of the bottom wall, the second set of longitudinal vertical ribs comprising a plurality of longitudinal vertical ribs of variable height extending from a second extremity of the locking mechanism to another corresponding extremity of the bottom wall.

13. The pipe support of claim 12, wherein a height of each rib of the first set of longitudinal vertical ribs matches a height of the first extremity of the locking mechanism at a junction of each rib of the first set of longitudinal vertical ribs and of the first extremity of the locking mechanism, the height of each rib of the first set of longitudinal vertical ribs constantly decreasing moving toward the corresponding extremity of the bottom wall, and wherein a height of each rib of the second set of longitudinal vertical ribs matches a height of the second extremity of the locking mechanism at a junction of each rib of the second set of longitudinal vertical ribs and of the second extremity of the locking mechanism, the height of each rib of the second set of longitudinal vertical ribs constantly decreasing moving toward the other corresponding extremity of the bottom wall.

14. The pipe support of claim 1, wherein the body of the pipe support further comprises an outside edge, the outside edge being bordered by a perpendicular border of variable height extending perpendicularly from the body, to the exception of the space for receiving the hanger located at a top extremity of each of the side walls, between the pair of transversal vertical ribs, the height of the perpendicular border increasing towards junctions of the perpendicular border and the ribs of the pair of transversal vertical ribs and matching the height of the ribs of the pair of ribs at the junctions.

15. A pipe support kit for supporting a horizontally extending pipe in combination with a vertical hanger, the pipe support kit comprising:
a pipe support comprising:
a U-shaped body being opened at a top end thereof and comprising a bottom wall and first and second side walls, the body, bottom wall and first and second side walls each having inner and outer surfaces extending along an axis between first and second extremities;
a pair of transversal vertical ribs, located on the outer surface of the body and extending transversally to the axis, the pair of transversal vertical ribs forming a space to receive the hanger therebetween, the space being positioned between the first and second extremities of the body;
a shock detection mechanism attachable to the pipe support, the shock detection mechanism comprising a shock indicator movable between a hold position and an alert position indicative that the pipe support was subjected to a shock exceeding a predetermined threshold force.

16. The pipe support kit of claim 15, wherein the pipe support further comprises a locking mechanism located on the outer surface of the bottom wall of the body and extending over a section of the pair of transversal vertical ribs, the locking mechanism comprising a door having a locking edge, the door being hingedly mounted with respect to the pair of transversal vertical ribs and being movable between an opened position wherein the door allows passage of the hanger between the pair of transversal vertical ribs, and a closed position wherein the door sits over the space for receiving the hanger.

17. The pipe support kit of claim 15, wherein the shock detection mechanism comprises:
a body having first and second faces;
a magnet receiving assembly for receiving a magnet therein, the magnet receiving assembly being mounted on the first face of the body;
at least one magnet positionable in the magnet receiving assembly, each of the at least one magnet producing a magnetic field;
at least one door pivotally mountable on the second face of the body, each of the at least one door having a finite thickness and being made of a magnetic material,
wherein when a combination of one of the at least one magnet and one of the at least one door is mounted on the shock detection mechanism, a strength of the magnetic field produced by the one of the at least one magnet and magnetic properties of the one of the at least one door are such that when the pipe support is subjected to a shock exceeding the predetermined threshold force, the door is released from the magnetic field produced by the one of the at least one magnet.

18. The pipe support kit of claim 17, wherein the door is pivotally mountable on the shock detection mechanism using a pair of appendages located at an extremity of the door on opposite sides, the pair of appendages being sized to fit into a pair of U-shaped arms on the second face of the body, each U-shaped arm of the a pair of U-shaped arms comprising an opening allowing insertion or removal of a corresponding appendage of the pair of appendages of the door therein.

19. The pipe support kit of claim 18, wherein a length of each arm of the pair of U-shaped arms is such that when the door is released from the hold position, following a shock exceeding the predetermined threshold force, the pair of appendages of the door are displaced towards an extremity of the U-shaped arms located opposite to the second face of the body, by gravity, thereby preventing the door from returning to the hold position by balancing of the door.

20. The pipe support kit of claim 17, wherein a plurality of magnets and a plurality of doors are provided, each magnet producing a magnetic field of a different strength and each door having different magnetic properties.

21. The pipe support kit of claim 17, wherein one magnet and a plurality of doors are provided, the magnet producing a magnetic field of a finite strength and each door having different magnetic properties.

22. The pipe support kit of claim 16, wherein the door of the locking mechanism is is shaped to removably receive the shock detection mechanism therein, and wherein the shock detection mechanism is mounted on the door.

* * * * *